Nov. 9, 1965     R. C. FRAMPTON ETAL     3,216,663
APPARATUS FOR WATERING PLANTS
Filed Nov. 13, 1963
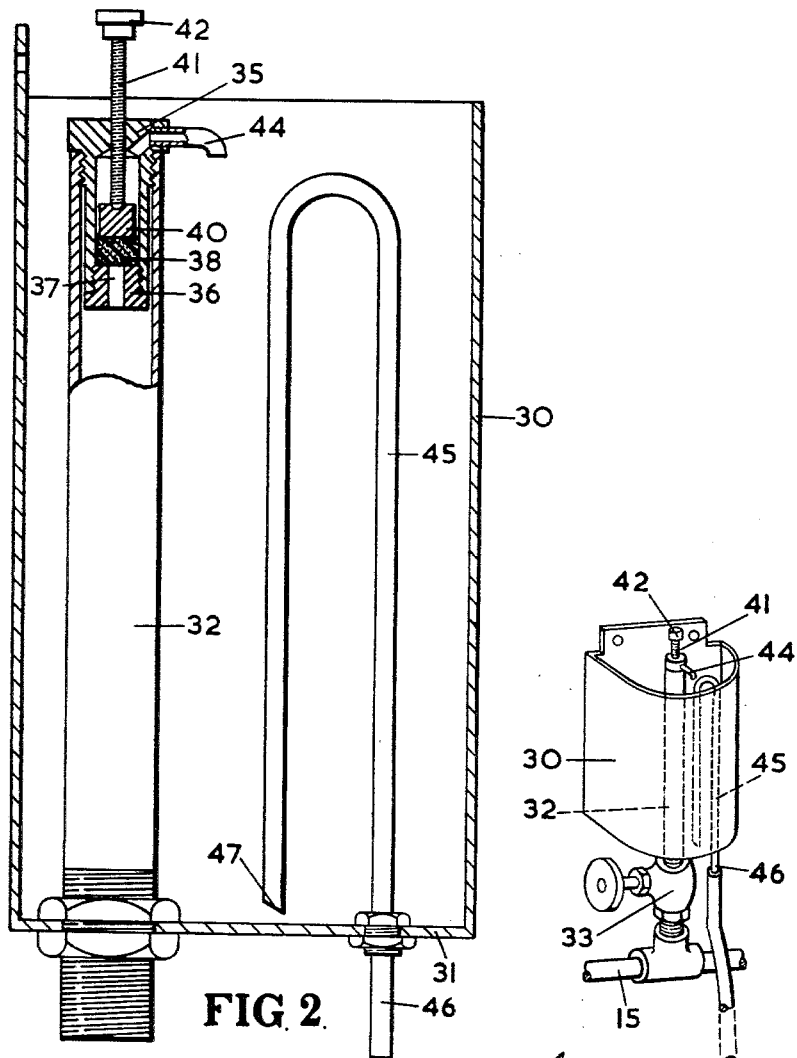
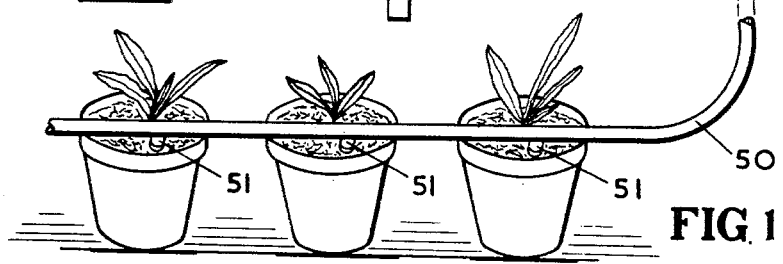

3,216,663
APPARATUS FOR WATERING PLANTS
Ronald C. Frampton and Douglas B. Lowndes, Bransgore, near Christchurch, England, assignors to Macpennys Mist Propagation Limited, Bransgore, Hampshire, England
Filed Nov. 13, 1963, Ser. No. 323,458
2 Claims. (Cl. 239—68)

The invention relates to apparatus for the periodic watering of plants. The term "plants" is used hereinafter to mean any horticulture or agriculture crops, plants or seeds.

An object of the invention is to provide an apparatus whereby the length of the intervals of time between successive watering operations and the length of each watering operation can be adjusted. A further object is to provide auxiliary apparatus for use for the watering of plants, which are in a more advanced state of growth than other plants to be watered and which require watering at longer intervals of time than that provided by a main watering system, which might depend upon moisture conditions or be operated at regularly timed intervals.

According to the invention, apparatus for watering plants comprises a tank arranged to receive a water supply, means for regulating the rate of flow of water entering the tank, a syphon tube mounted within the tank and having a discharge limb arranged to discharge water from within the tank, when the water level within the tank reaches a height at which the syphon tube will operate, into one or more irrigation pipe lines, each having an orifice or nozzle, or a series of orifices or nozzles therein.

Conveniently the aforesaid apparatus, referred to herein as "the auxiliary apparatus," may be combined with other apparatus, referred to herein as "the main apparatus," for periodically watering the said or other plants, the tank of the auxiliary apparatus being of such capacity that the syphon tube will not discharge or empty the tank until the main apparatus has operated a desired number of times. The main apparatus and the regulating means of the auxiliary apparatus may be supplied by a common supply pipe. The main apparatus may be supplied through a water supply valve arranged to be opened and closed by an electrical circuit, controlled by moisture conductivity across a pair of electrodes in the circuit, the tank of the auxiliary apparatus also being supplied by the said water supply valve.

Figure 3:
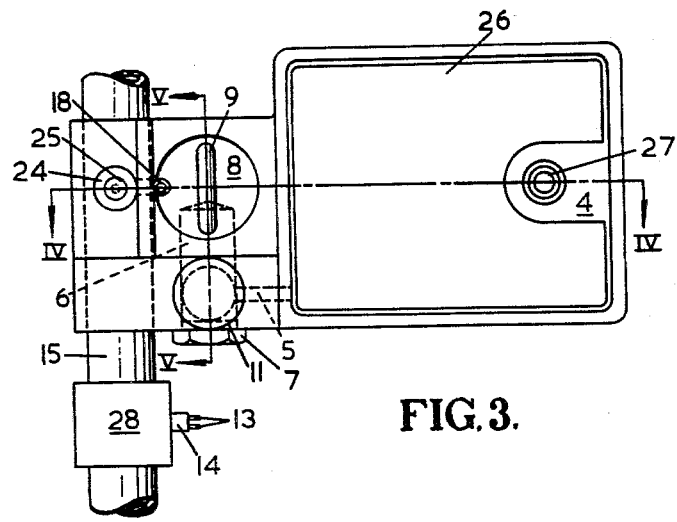
Figure 4:
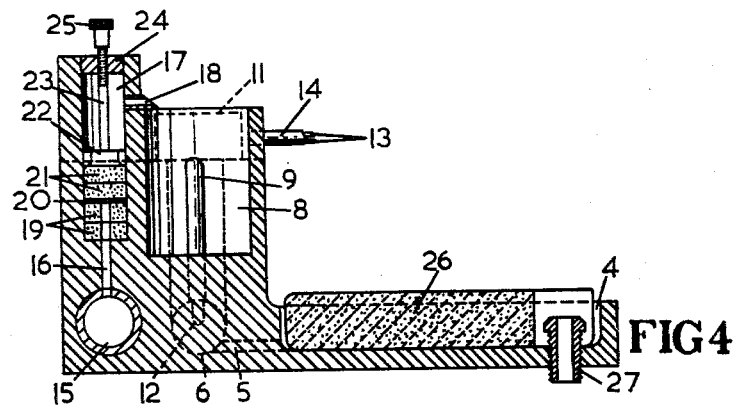
Figure 5:
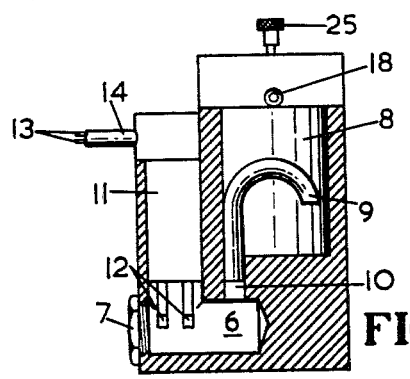

By way of example, one form of apparatus according to this invention will now be described with reference to the accompanying drawings in which:

FIGURE 1 is a diagrammatic view of apparatus for watering plants, said apparatus being either an independent watering means or an auxiliary watering means, FIGURE 2 is a vertical longitudinal sectional view of part of the apparatus shown in FIGURE 1, FIGURE 3 is a plan view of a main watering apparatus, FIGURE 4 is a vertical section on the line IV—IV in FIGURE 3, and FIGURE 5 is a section on the line V—V in FIGURE 3.

The apparatus shown in FIGURES 1 and 2 will first of all be described as an independent watering apparatus. The apparatus comprises a tank 30 and a feed pipe 32, connected to a main water supply pipe 15, and extending upwardly through the bottom 31 of the tank 30 in a watertight connection. Incorporated in the feed pipe 32, there is a control valve 33 by means of which the flow of water through the pipe 32 can be selectively controlled. The upper end of the feed pipe 32 carries a drip control valve, i.e. the adjustable regulator referred to hereinbefore. This valve includes a tubular body 35, threadedly engaged with the feed pipe 32 and having a bottom plug 36 fitted therein. The plug 36 has a central throughway 37 covered at its upper end by a resilient porous pad 38, supported on the upper surface of the plug 36. The porous pad 38 permits water under pressure to seep upwardly through it, the rate of such seepage being dependent upon the compressed state of the pad. Slidably supported within the body 35 there is a plunger 40, which is moved vertically by a spindle 41, threadedly mounted in the body 35. The spindle 41 is turned by a knob 42, provided at its upper end. The plunger 40 is of slightly smaller diameter than the interior diameter of the tubular body 35, thereby permitting water to flow there-around to an outlet pipe 44, arranged to discharge into the interior of the tank 30. By turning the knob 42, the compression of the pad 38 may be varied and so the rate of flow of water through the outlet pipe 44 can be controlled. In the desired range of settings, the water emerges from the outlet pipe 44 in a series of drips.

A syphon tube 45 is supported in an upright position inside the tank 30 and has a discharge end 46, which extends through the bottom 31 of the tank 30 in a watertight fitting. The discharge limb of the syphon tube 45 may be slidable in the fitting, so that the syphon tube can be selectively positioned vertically in the tank, thereby to vary the height of water which has to collect in the tank before the syphon tube will discharge. The inlet end 47 of the syphon tube 45 is positioned just above the bottom 31 of the tank 30.

The discharge end 46 of the syphon tube is connected to an irrigation pipe line 50 of any desired length. This line carries a plurality of spaced nozzles 51, which may be arranged to provide individual watering of plants. These nozzles may include valves (not shown) for providing on/off operation of the nozzles individually, as desired. Alternatively, the nozzles may be so arranged as to form a spray or mist over a row of plants. Instead of nozzles, the pipe line 50 may be provided with orifices. Although a single pipe line 50 is shown, any number of such lines may be employed.

The operation of the apparatus is as follows. On opening the valve 33 water under the supply pressure flows upwardly through the feed pipe 32 and seeps upwardly through the porous pad 38 and discharges from the outlet pipe 44 into the tank 30, according to the setting of the knob 42. As has been stated, the range of settings is conveniently such that the water will emerge from the outlet pipe 44 in a series of drips and thus the tank 30 will take a considerable time to fill. When the water level reaches the top of the syphon tube 45, substantially the entire contents of the tank 30 are emptied through the outlet end 46 of the discharge limb of the syphon tube to the irrigation line 50. To obtain the necessary pressure head, the tank 30 should be mounted several feet above the level of the nozzles 51 in the irrigation line 50. As stated hereinbefore, the syphon tube 45 may be vertically adjustable in the tank 30 to vary the quantity of water which will be collected therein before discharge and thus to vary the period of time between successive discharges and also the quantity of water which will be discharged at each operation.

As stated hereinbefore, the apparatus described with reference to FIGURES 1 and 2 may be used as an auxiliary apparatus in combination with any main apparatus. The main apparatus may be arranged to water certain plants or a designated area of ground at timed intervals or at intervals depending upon ambient conditions, such as moisture. The main and auxiliary apparatus would normally be supplied by the same main supply pipe 15 and thus the auxiliary apparatus can be adjusted to supply water at its own particular intervals of time and in quantities different from those plants to be supplied by the main apparatus.

One form of main apparatus is shown in FIGURES 3, 4 and 5 and controls the flow of water from the supply pipe 15 to a distribution pipe by a main control valve 28, which may be upstream or downstream of the branch in the pipe 15 leading to the valve 33 in FIGURE 1. The main control valve 28 is controlled by an electrical circuit, including a pair of electrodes 12 responsive to the moisture condition of a detecting pad 26 shown in FIGURES 3 and 4.

The main apparatus includes a well 4 communicating through a horizontal passage 5 with a chamber 6 which is closed at one end by a plug 7 and extends partly beneath a reservoir 8 having a syphon pipe 9 opening at 10 into the chamber 6. Above the chamber 6 there is a vertical chamber into which fits an electrode holder 11, from the lower end of which a pair of spaced electrodes 12 project into the chamber 6. The electrodes 12 are connected to leads 13 enclosed in an electric cable 14 which is connected to an electrical circuit including a relay (not shown) for opening and closing the main control valve 28 through which water can be supplied to the supply pipe 15. The pipe 15 has a small outlet aperture connected by a vertical passage 16 to the lower end of a cylindrical valve chamber 17, which in turn has a drip pipe 18 opening into the upper end of the reservoir 8. The valve chamber is packed, with resilient porous rings 19, e.g. of felt, below a metal or other disc 20, above which are placed resilient porous discs 21, e.g. of sponge rubber. A superposed pressure disc 22, e.g. of metal, is arranged to be pressed down upon the rings or discs 19 to 21 by means of a spindle 23 which is screw-threaded through a gland nut 24 and can be adjusted by turning a knob 25. It will be seen that the rings or discs 19 to 21 form a means of regulating the flow of water from the water pipe 15 to the reservoir 8, but any other form of regulating valve may be employed.

The well 4 is shown provided with a block 26 of ceramic, but any other porous or absorbent substance may be employed. An adjustable overflow 27 is provided for adjusting the maximum level of water in the well.

In operation, the well 4 and chamber 6 are normally full of water up to the level of the overflow, water is contained in the reservoir 8 up to the inlet end of the syphon pipe 9, and moisture may evaporate from the block 26. As the electrodes 12 are in contact with the water in chamber 6, an electric circuit is closed through the electrodes and this circuit operates a relay to close the main control valve 28 or allow it to close, so that the supply of water to the pipe 15 is cut off. When the level of water in the well 4 and chamber 6 drops to such an extent that the conductivity across the electrodes 12 is broken, the relay in the electric circuit opens the main valve 28 or allows it to open, so that water is distributed to the main irrigating or water system. At the same time, a regulated quantity of water from the pipe 15 passes to the drip pipe 18 into the reservoir 8 until it finally rises to the top of the syphon pipe 9, when the water syphons into the chamber 6 and refills the well 4. The rate of drip into the reservoir 8 can be regulated according to the time interval which is to be allowed to lapse before the electric circuit is completed through the electrodes 12 to close the valve 28 and cut off the water supply to the main apparatus or to both the main and auxiliary apparatus, according to the position of the valve 28 in relation to the branch leading to the valve 33 in FIGURE 1.

The electrodes 12 may be made of carbon or other non-corrodible material and may be embedded in the holder 11, which may be made of any suitable insulating material. If desired, one of the electrodes may enter the chamber 6 below the normal water level and the other electrode may make contact with the water at or near the maximum water level.

In order to shield the well 4 from the direct impinging thereon of spray from an adjacent spraying device, and to increase the sensitivity of the detector, the detector device may be provided with a shield which can be interposed between the well and any adjacent spraying device. The shield may also be arranged to divert droplets of spray into the well.

Where the main control valve is upstream of the branch leading to the valve 33 of the auxiliary apparatus, each time water is admitted to the common main supply pipe 15 by the main apparatus, water is also admitted to the tank 30 of the auxiliary apparatus. The frequency of watering and the quantity of water supplied to the pipe line 50 by the auxiliary apparatus is dependent upon the selective compression of the porous pad 38, the height of the top of the syphon tube 45 and the extent to which the valve 33 has been opened. For example, it may be desired that the main apparatus should give repeated watering operations before the auxiliary apparatus operates. Alternatively it may be desired that the auxiliary apparatus should operate each time the main apparatus operates.

Although the terms "water" and "watering" have been used herein, the apparatus may be used to discharge other liquids, e.g. liquid manure or treated water.

What we claim as our invention and desire to secure by Letters Patent of the United States is:

1. Apparatus for periodically discharging a controllable quantity of liquid to an irrigation pipe line, the apparatus comprising a tank, a supply pipe positioned to feed said tank with liquid, means for regulating the rate of flow of liquid to said tank, a syphon tube mounted in said tank, said syphon tube having a discharge limb positioned to discharge liquid from within said tank, when the level of liquid therein has reached a height at which the syphon tube will operate and at least one irrigation pipe line connected to said discharge limb and having therein at least one discharge opening, said regulating means comprising a cylindrical housing having inlet means to be connected to said supply pipe and a drip tube at its outlet end positioned to discharge into said tank, at least one resilient compressible porous pad, a plunger movable axially in said housing to compress said pad and hence alter its porosity and a screwed adjusting rod engaging said housing, whereby said plunger is adjustable axially in the housing to vary the compression of said pad.

2. Apparatus for periodically discharging a controllable quantity of liquid for the irrigation of plants, the apparatus comprising a supply pipe, a main discharge pipe communicating with said supply pipe, a main control valve positioned in said supply pipe to control the discharge of liquid through said main discharge pipe, a detector responsive to an environmental condition of said plants, means controlled by said detector for opening and closing said main control valve, a branch pipe leading from said supply pipe downstream of said main control valve, a tank arranged to be supplied by said branch pipe, means for regulating the rate of flow of liquid through said branch pipe, a syphon tube mounted in said tank, said syphon tube having a discharge limb positioned to discharge liquid from within said tank, when the level of liquid therein has reached a height at which said syphon tube will operate and at least one auxiliary irrigation pipe line connected to said discharge limb and having therein at least one discharge opening, said regulating means comprising a cylindrical housing having inlet means connected to said branch pipe and a drip tube at its outlet end positioned to discharge into said tank, at least one resilient compressible porous pad, a plunger movable axially in said housing to compress said pad and hence to alter its porosity and a screwed adjusting rod engaging said housing, whereby said plunger is adjustable axially in said housing to vary the compression of said pad, said tank having a capacity such that said syphon tube will discharge only when said main control valve has operated a desired number of times.

References Cited by the Examiner

UNITED STATES PATENTS

| | | | |
|---|---|---|---|
| 1,293,017 | 2/19 | Broche | 222—416 |
| 1,819,267 | 8/31 | Rybeck | 222—416 |
| 2,695,976 | 11/54 | Hasenkamp | 315—76 |

FOREIGN PATENTS 1,295,374  5/62  France.

EVERETT W. KIRBY, *Primary Examiner.*